April 28, 1931.  R. W. FIEROH  1,802,340
CONCRETE PLANT
Filed July 8, 1929  4 Sheets-Sheet 2

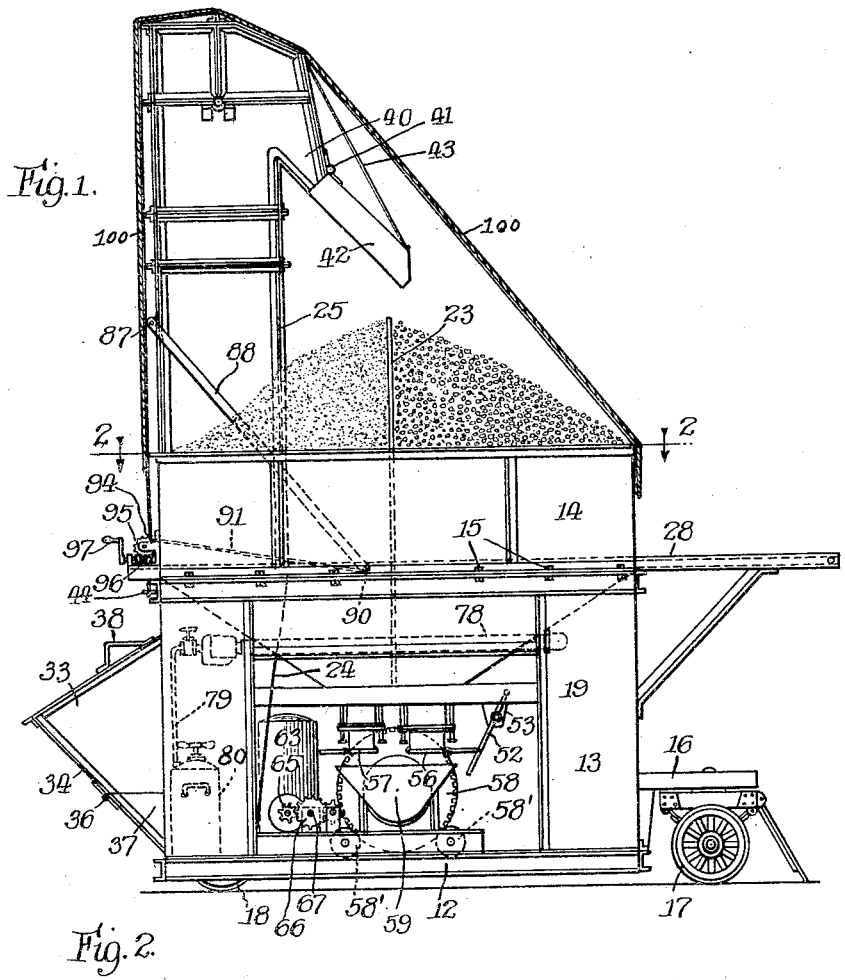

Inventor:
Robert W. Fieroh,
By Fisher, Clapp, Soans & Pond,
Attys.

April 28, 1931. R. W. FIEROH 1,802,340
CONCRETE PLANT
Filed July 8, 1929 4 Sheets-Sheet 3

Inventor:
Robert W. Fieroh,
By Fisher, Clapp, Soans & Pond, Attys.

April 28, 1931. R. W. FIEROH 1,802,340
CONCRETE PLANT
Filed July 8, 1929 4 Sheets-Sheet 4
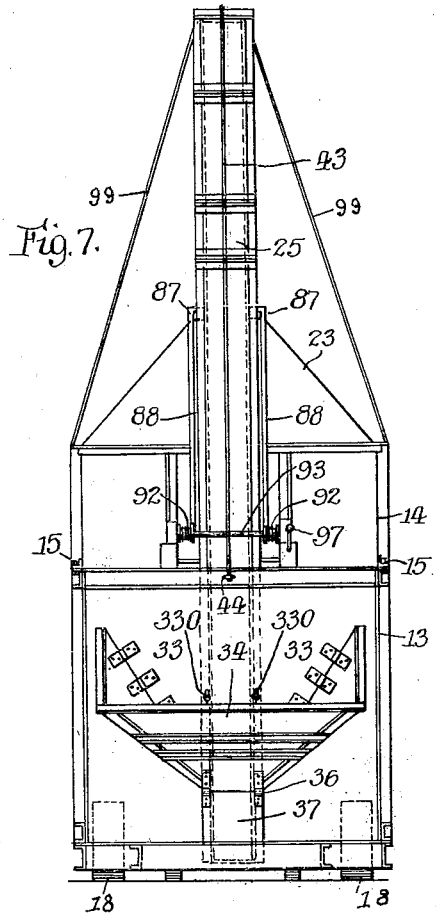
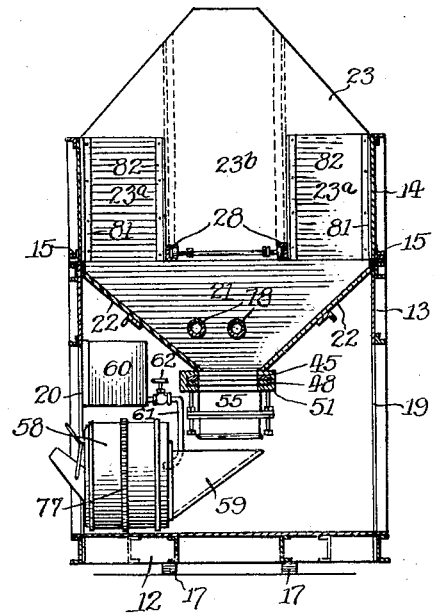
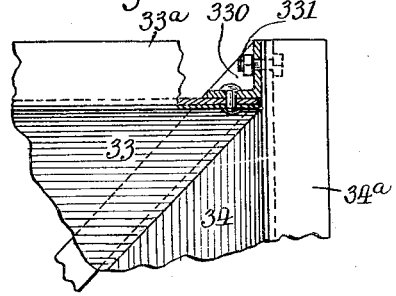
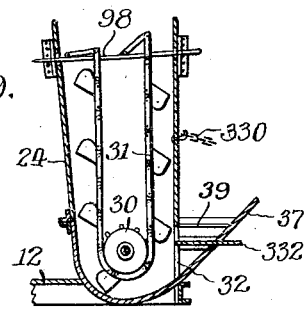
Inventor:
Robert W. Fieroh,
By Fisher, Clapp, Soans & Pond, Attys Patented Apr. 28, 1931

1,802,340

UNITED STATES PATENT OFFICE

ROBERT W. FIEROH, OF CHICAGO, ILLINOIS

CONCRETE PLANT

Application filed July 8, 1929. Serial No. 376,792.

This invention relates to the art of concrete mixing plants, having reference more particularly to plants of the portable type adapted to be readily drawn from one place of operation to another.

Among the objects of the invention are, to provide a concrete mixing plant that can be operated with a minimum amount of time and labor; to provide a plant having large enough bin capacity to operate for a considerable period of time without receiving any fresh material; to provide, as an element of the plant, a conveyor of at least double the capacity of the mixer; to provide a concrete plant equipped with means for heating the material both in the conveyor and in the material bin for winter work to thereby eliminate any danger of the material freezing when the plant is not operating; to provide an improved plant that will eliminate hand loading or handling of the material into the mixer; to provide a plant adapted to speed up production by fast loading of the mixer; to provide a plant built in readily separable sections, by which it may be readily loaded on a flat car; to provide a plant which may economically be protected against weather conditions; to provide, in a concrete plant, an improved bucket conveyor and conveyor casing which can be folded down to reduce the height of the plant when moving the latter from place to place; to provide a plan involving a minimum amount of time and labor to put the machine into operating condition after arrival at a job, and to prepare the machine for transfer to another job; and, in general, to provide a complete and compact portable concrete plant requiring a less number of attendants to effect a much greater output than required by the ordinary concrete outfits now in common use.

Still other objects and attendant advantages of the invention will be apparent to persons skilled in the art as the same becomes better understood by reference to the following detailed description, taken in connection with the accompanying drawings in which I have illustrated one simple and practical embodiment of the invention, well adapted to effectuate the stated purposes and objects thereof, and wherein—

Fig. 1 is a side elevation of the complete machine as set up and ready for work.

Fig. 2 is a plan section on the line 2—2 of Fig. 1.

Fig. 7 is an elevation of the receiving end of the machine.

Fig. 8 is a vertical transverse section taken on the line 8—8 of Fig. 3.

Fig. 9 is a vertical section of the lower portion of the elevating conveyor and its casing, illustrating a device for supporting the lower portion of the conveyor chain when the upper portion of the latter has been removed.

Fig. 10 is a fragmentary top plan of a corner portion of the collapsible receiving hopper.

Figure 4:
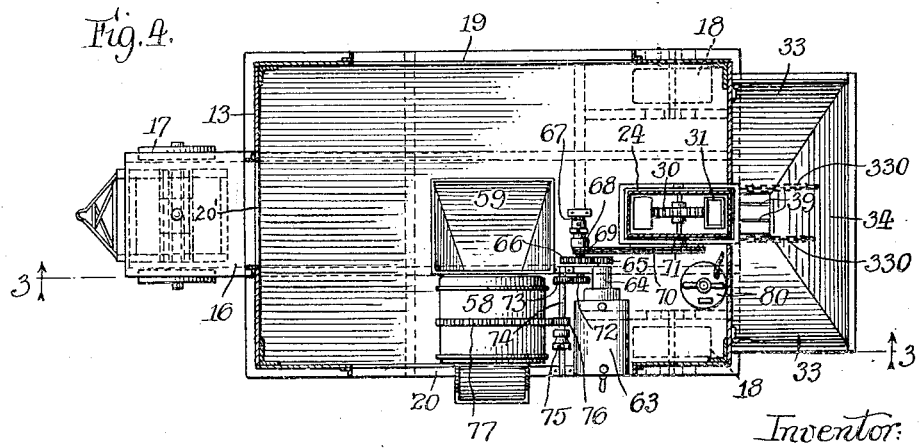
Fig. 4 is a horizontal section taken on the offset line 4—4 of Fig. 3.

Referring to the drawings, 12 designates as an entirety a rectangular skeleton steel platform, superposed on which is a rectangular material bin comprising a lower section 13, and a removable upper section 14 resting upon the lower section and united thereto as by bolts 15 passed through registering flanged bars on the meeting edges of said sections. The platform and superposed sectional material storage bin are supported on wheels for ready portability or blocking when in use on a job. To one end wall of the lower section 13 is suitably attached a cement loading platform 16 in which is swiveled a pilot truck 17, while rear wheels 18 are journaled on suitable axles mounted in the frame members of the floor platform 12, as indicated in Fig. 4.

In one of the side walls of the bin section 13 is an opening 19 (Fig. 4) of sufficient size to readily permit the entrance of a workman and also to receive cement; and in the opposite side wall is an opening 20 opposite the discharge end of the concrete mixing drum, to permit discharge of the prepared material from the latter; and in the front wall is an opening 20' opposite the platform 16.

The lower section 13 of the material bin is equipped with a false bottom, best shown in Fig. 2, the end walls 21 and side walls 22 of which slope downwardly to discharge devices hereinafter described. The space within the upper bin section 14 and the space within the lower bin section 13 above the false bottom is divided approximately centrally, for the separate storage of sand and gravel or crushed stone, by a vertical transverse partition designated as an entirety by 23, this partition extending down to the discharging devices in the false bottom as clearly shown in Fig. 5. Viewing the latter figure, the space to the left of partition 23 is designed to contain gravel or crushed stone, and that to the right of partition 23 is for sand. The space within that portion of the lower bin section 13 underlying the false bottom is designed for the storage of bags of cement.

Suitably built into one end of the lower bin section 13 is the lower, fixed section 24 of an elevator casing, superposed on which is an upper hinged section 25. The inner or front wall of the upper section 25 is pivotally jointed in register with the inner or front wall of the lower section 24 by suitable hinges 26, the hinge rod 27 of which (Fig. 2) is supported by a pair of horizontally extending channel bars 28 overlying the lower bin section 13, for a primary purpose hereinafter described. Journaled in the upper and lower ends of the conveyor casing are the usual sprocket wheels 29 and 30, over which is trained the usual endless bucket conveyor 31. In the end wall of the bin section 13 behind which the conveyor casing is located is a material receiving opening 32, above which extends a receiving hopper. In the preferred form herein shown, this hopper comprises a pair of downwardly and inwardly flaring side walls 33 (see Fig. 2), and a downwardly and inwardly flaring end wall 34. The side walls 33 are hinged at their vertical edges to the end wall of the bin, as shown at 35 (Fig. 2) so as to fold inwardly against the latter, while the end wall 34 of the hopper is hinged at its lower end at 36 to the upper edge of a stationary throat section 37 of the hopper that is attached to the end wall of the bin section. After the side walls have been folded inwardly, the end wall 34 may also be swung inwardly against the folded side walls, thus providing a collapsible hopper structure which reduces the total length of the machine when the latter is in transit from job to job. Brackets 38 attached to the upper edges of the side walls 33 form a support for a plank scaffold to operate a winch hereinafter described and to pull down material from truck bodies dumping into the hopper. Referring to Fig. 4, grid bars 39 extending across the stationary lower section 37 of the receiving hopper limit the size of particles of material that pass to the conveyor.

For stiffening purposes angles 33$^a$ and 34$^a$ (Fig. 10) are attached to the upper edges of the side and end walls of the hopper. To lock the side and end walls in unfolded position, the downwardly and inwardly inclined free edges of the side walls 33 are equipped externally with angles 330, and the marginal portions of the end wall 34 which overlap the angles 330 are detachably united to the latter by fastening bolts 331, said bolts being removed when it is desired to collapse and fold the hopper. In the stationary section 37 of the hopper is a sliding valve plate 332, which regulates the flow of material to the conveyor buckets according to the speed and capacity of the conveyor. Chains 333 (Figs. 2 and 5) support the wall 34 against deflection when loaded, and relieve strain on the hinges of the side walls 33.

Figure 3:
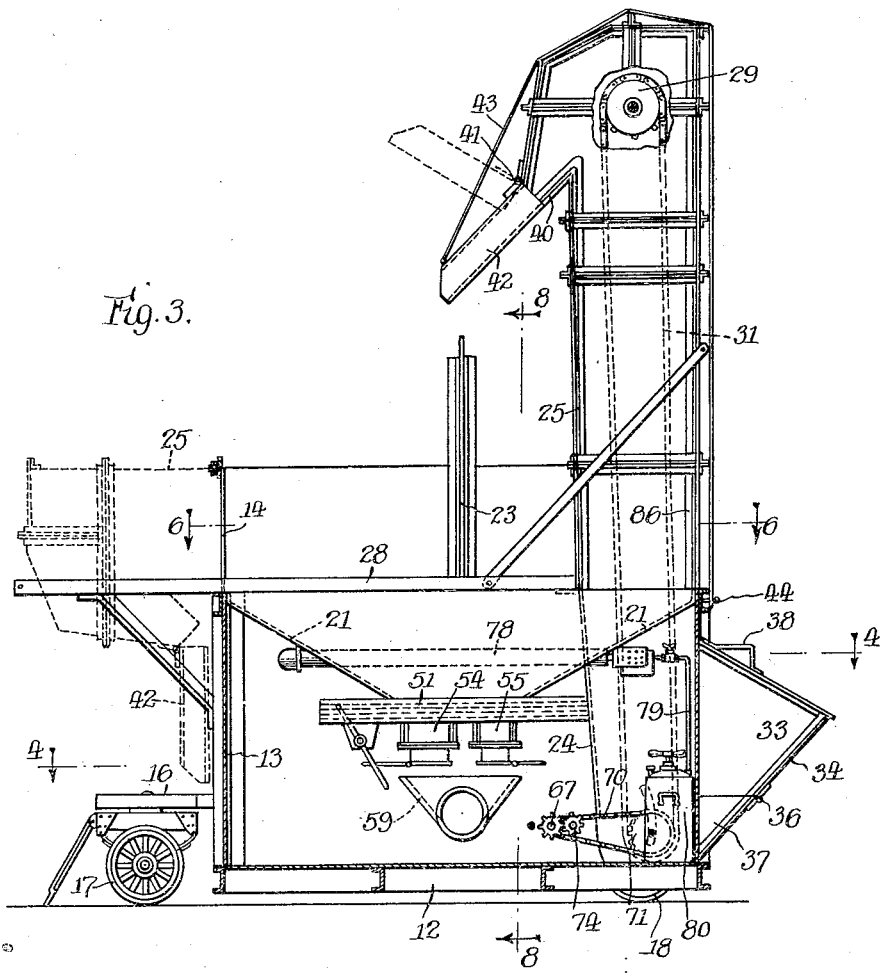
Fig. 3 is a side elevation, viewed from the opposite side of the machine, and partly in vertical section on the line 3—3 of Fig. 4.

The upper end of the conveyor casing is provided with the usual fixed discharge chute 40, and to the latter is hinged at 41 an extension chute 42 which can be lowered as shown in full lines in Fig. 3 to discharge gravel or crushed stone into the gravel or stone section of the storage bin, or can be raised to the dotted line position to permit the discharge of sand through chute 40 into the sand section of the storage bin. This extension chute is operated by a cable 43 carried upwardly over the top of the conveyor casing and downwardly of the front side of the latter, its lower end being anchored to a pin 44 secured in a frame bar of the material storage bin.

Figure 5:
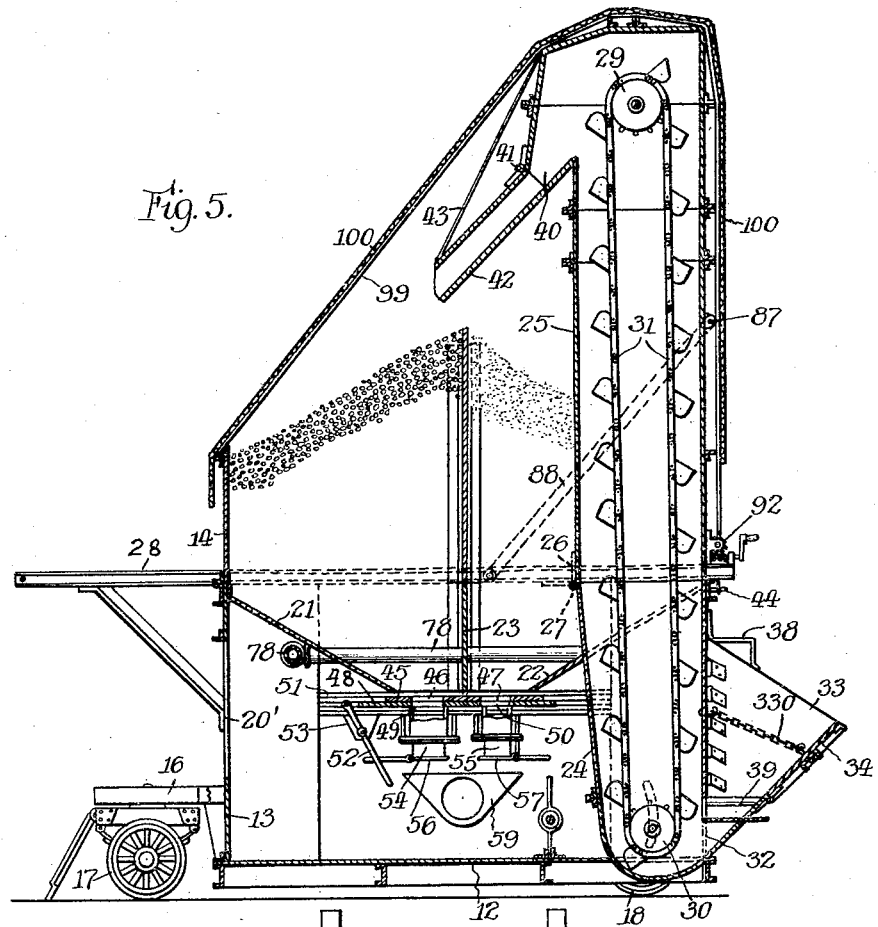
Fig. 5 is a vertical longitudinal section on the line 5—5 of Fig. 4.

The hopper bottom of the storage bin consists, as shown in Figs. 2 and 5, of a flat plate 45 formed with discharge openings 46 and 47 for the discharge of gravel and sand respectively; and below the bottom plate 45 is a sliding valve plate 48 formed with corresponding openings 49 and 50 movable into and out of register with the openings 46 and 47. The plates 45 and 48 are supported at their longitudinal edges by a guide frame 51 that may in turn be attached to the side and end plates of the hopper bottom; and the valve plate 48 is operated by a hand lever 52 pivoted on a bracket 53 (Fig. 5) depending from the guide frame 51.

Depending from the guide frame 51 are a pair of measured charge spouts 54 and 55, the lower ends of which are controlled by valves 56 and 57. These measured charge spouts are old and well known devices in connection with material hoppers or bins, and are not disclosed in full detail as no novelty therefor is claimed herein.

Mounted on rollers 58' journaled in the platform 12 directly opposite the side opening 20 is a rotary mixer 58 which may be of the ordinary type, attached to the intake side of which is a receiving chute 59 of sufficient width to underlie the charging spouts 54 and 55. Suitably mounted on a side wall of the material bin above the mixer 58 is a water tank 60 (Fig. 8), from which a pipe 61 controlled by a hand valve 62 leads into the receiving mouth of the mixer 58.

Clutch controlled power means are provided for rotating the mixer 58 and driving the elevating conveyor. Such means are best indicated in Fig. 4, and comprise the following. 63 designates as an entirety a motor, herein indicated as a gas engine but which may be any suitable or convenient type of motor, the power shaft 64 of which, through a pinion 65 and gear 66, drives a counter shaft 67. Drivingly connected to the counter shaft 67 by a manually operable clutch 68 is a sprocket wheel 69 which, through a sprocket chain 70, drives a sprocket wheel 71 fast on the shaft of the lower conveyor sprocket 30. On the outer end of the counter shaft 67 is a gear 72 driving a gear 73 fast on a second counter shaft 74, and drivingly connected to the latter shaft through a manually operable clutch 75 is a pinion 76 meshing with and driving the usual ring gear 77 on the mixer 58. Through the above mentioned clutches, the mixer and the conveyor may be operated either simultaneously or independently.

Means are provided for heating the material both in the material bin and in the casing of the elevator. The means herein shown comprises a U-shaped pipe 78, the parallel limbs of which extend horizontally through the bin, passing through both of the end walls 21 of the latter as clearly shown in Figs. 2 and 3. To one end of this heater pipe is connected a valve controlled supply pipe 79 leading from a kerosene pressure tank 80 mounted in one corner of the material bin, the said end of the pipe 78 being apertured, as shown in Fig. 3 to provide a Bunsen flame. The opposite end of the heater pipe 78, as shown in Fig. 2 registers with an opening in the inner wall of the conveyor casing, whereby the flame and hot products of combustion flowing through the pipe 78 project into the conveyor casing and impart heat to the material being elevated in the latter. The portions of the pipe 78 extending through the bin hopper, of course, radiate a large amount of heat to the gravel and sand in the latter.

The apparatus for heating the material above described is not claimed herein, but forms the subject matter of a continuing application filed by me December 6, 1930, Serial No. 500,458.

Figure 6:
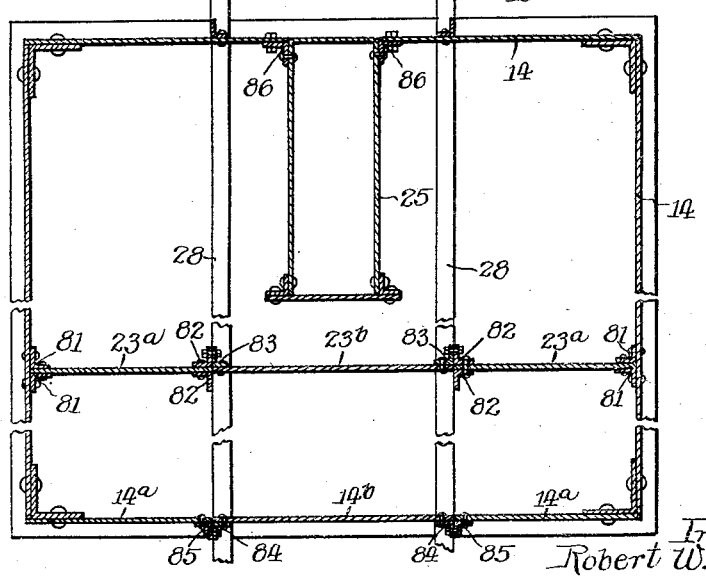
Fig. 6 is a horizontal section through the upper section of the material bin and the conveyor casing, taken on the line 6—6 of Fig. 3.

In order to permit the upper section 25 of the conveyor casing to be folded down to the horizontal position illustrated by dotted lines in Fig. 3, it is necessary to provide for the removal of a portion of the partition 23 and also a portion of the front end wall of the upper section 14 of the material bin. Referring to Figs. 6 and 8, the end section $23^a$ of the partition plate 23 are permanently attached to the side walls of the upper section 14 of the bin as by means of angles 81 riveted to the bin walls and the partition wall sections, and angles 82 riveted to the wall sections $23^a$ and at their lower ends suitably secured to the outer sides of the channel bars 28. The removable section of the partition wall designated by $23^b$ comprises a lower rectangular portion fitting between the inner edges of the permanent sections $23^a$ and an upper full width portion, the lateral extensions of which rest upon the upper edges of the stationary sections $23^a$, as clearly shown in Fig. 8. This removable section is secured in place by angles 83 attached thereto and bolted to the angles 82. By removing the fastening bolts, the entire removable section can be withdrawn, thus leaving a central gap in the partition wall into which the hinged section of the conveyor casing may enter. The front wall of the bin section 14 also includes a removable intermediate section $14^b$ (Fig. 6) which normally lies between and in line with the end sections $14^a$ thereof and is detachably connected to the latter by angles 84 riveted to the intermediate section $14^b$ and bolted to mating angle sections 85 that are riveted to the permanent wall sections $14^a$. Thus, by the withdrawal of the removable sections of the partition wall and the front end wall of the material bin, the hinged upper section of the conveyor casing can be folded down so as to reduce the total height of the machine by approximately one-half, permitting the machine to be drawn from place to place beneath viaducts or other highway obstructions that would otherwise prevent the passage of the machine on account of the height of the latter. The folding of the upper hinged section of the conveyor casing can be effected without disconnecting the conveyor, there being sufficient slack in the latter to permit this operation.

The hinged section 25 of the conveyor casing is secured in its elevated position as by means of angles 86 (Fig. 6) attached to its opposite side walls and bolted to the rear wall of the upper section 14 of the material bin. Upon withdrawal of the fastening bolts, the elevator casing section is free to swing downwardly.

The conveyor casing section 25 may be raised and lowered by a hand winch best shown in Figs. 1, 2 and 7. Pivoted at 87 to lugs on the hinged casing section 25 are a pair of struts 88, in the lower forward ends of which is journaled a transverse shaft 89, on the outer ends of which shaft are rollers 90 that travel in the channel bars 28. To the shaft 89 are attached a pair of cables 91 that extend back to and around drums 92 fast on a shaft 93 that is journaled in and between a pair of bearing lugs 94 attached to the rear wall of the upper bin section 14. Fast on one end of shaft 93 is a worm wheel 95 driven by worm 96 equipped with an operating handle 97. After the casing section has been detached from the rear wall of the bin by disconnecting the angles 86 from the latter, it is given a forward push, and simultaneously the winch is turned backwardly to pay out the cables 91. This permits the struts 88 to slide forwardly and the hinged casing section to be gradually lowered to horizontal position. The winding up of the winch manifestly gradually elevates the hinged casing section again to vertical position, after which it is relocked in place.

Before removing the upper sections of the material bin and conveyor casing it is necessary, of course, to disconnect the portions of the conveyor chain lying below and above the horizontal plane of the hinge 27. This is readily done by removing pivot pins connecting adjacent lengths of the chain, as is indicated in Fig. 9; and in order to prevent the lower section of the chain from falling into the bottom section of the casing, and to facilitate the connecting up of the conveyor chain, the lower section of the latter is supported, prior to the disconnection, by a pin 98 passed through apertures in the front and rear walls of the casing and through opposed lengths of the chain, all as clearly shown in Fig. 9.

When the machine is to be transported by railroad, it may be loaded on a flat car in two sections, one in advance of the other. To effect this, the conveyor chain is first separated, as above described, the upper section of the casing is folded down to the horizontal position, and the bolts 15 by which the upper section 14 of the material bin is attached to the lower section 13, are removed, whereupon the entire structure can be separated along the horizontal plane of the joint between the lower and upper bin sections, and the two sections independently placed on a flat car. This is a substantial advantage, since the machine, even in its folded condition, is unduly high for safe transportation on a flat car.

To protect the material in the two compartments of the material bin against rain, snow, sleet, etc., and to retain the heat escaping from the sand and gravel and the conveyor casing, I extend a pair of cables 99 from the forward front corners of the conveyor casing to the forward front upper corners of the material bin, said cables forming a support for a rain-proof canopy 100, which latter, as shown in Fig. 5, may also extend over the top and down the rear side of the conveyor casing. This permits operation of the machine in rainy and cold weather, by preventing wetting and freezing of the gravel and sand which would interfere with the free flow of the latter.

The operation has been to a considerable extent, set forth in connection with the description of the structural organization of the plant, but may be briefly reviewed as follows.

The machine having been brought to the place of operation, and blocked up to relieve load on the wheels (which are designed only for transportation of the machine), the receiving hopper is opened out, and trucks carrying gravel are backed up to and discharged into the receiving hopper, and, with the mixer clutch 75 thrown out and the conveyor clutch 68 thrown in, and with the spout 42 in the lowered position, the gravel compartment of the material bin is filled. Then, with the hopper spout 42 elevated to the dotted line position shown in Fig. 3, the sand compartment of the bin is similarly filled. Cement in sacks is then delivered to the platform 16, and, by a workman, carried through the opening 20', and deposited in the substantial space underlying the hopper bottom of the gravel and sand compartments. The machine is thus loaded with material to form the mix, and thereupon the operator manipulates the valve 48 to pass measured charges of gravel and sand into the mixer, adding by hand a suitable proportion of cement which may be dumped into the chute 59. The cock 62 is then opened to supply to the material already charged into the mixer a suitable amount of water, and then clutch 75 is thrown in and the mixer rotated until the ingredients are thoroughly mixed and ready to be spread, whereupon the discharge gate of the mixer is opened and the prepared batch delivered to wheelbarrows for manual transportation to the points of use.

It is evident that while material is being thus passed from the storage bin to the mixer, fresh material may be simultaneously added to the storage bin by continuing the operation of the conveyor. The capacity of the machine, however, is such, that it is capable of being operated continuously for a considerable period of time, so that supplies of fresh material do not have to be closely synchronized with the deliveries from the machine, thus giving the latter a greater degree of independence of operation than has heretofore been possible with the ordinary concrete mixers now in common use.

The described heating feature enables the machine to operate in cold weather without interruption from clogging the material through freezing.

Important advantages of the machine are the foldability of the upper conveyor section, permitting the machine to be hauled from place to place where head room may be limited, and the separability of the upper and lower bin sections, permitting the machine to be loaded on a flat car without presenting an unduly high center of gravity, such as might require bracing for safe transportation. Another advantage resides in the fact that the storage space for the cement is entirely protected from the weather, as the side openings can be canvas covered, thus avoiding loss and trouble through accidental wetting of the cement.

While I have shown and described one practical and improved embodiment of the invention, I do not limit the latter to the details of structure and organization disclosed for purposes of illustration, but reserve such variations, modifications and mechanical equivalents as fall within the spirit and purview of the claims.

I claim:

1. In a concrete mixing plant, the combination of a platform, a material bin on said platform, an upright conveyor casing mounted on said platform within said bin having a receiving opening at its lower end, an endless bucket conveyor within said casing, and a receiving hopper comprising a lower fixed portion opposite said opening and an upper collapsible portion comprising side walls hinged to a wall of said bin, and an end wall hinged at its lower edge to said fixed portion.

2. In a concrete mixing plant, the combination of a platform, a material bin on said platform, and an upright conveyor casing mounted on said platform, said casing comprising a lower fixed section located within the rear end of said bin, and an upper section horizontally hinged relatively to said lower section in the plane of the front walls of said sections and foldable down on to said bin.

3. In a concrete mixing plant, the combination of a platform, a material bin on said platform, an upright conveyor casing mounted on said platform, said casing comprising a lower fixed section and an upper horizontally hinged section extending above said bin and foldable down on to the latter, and means for raising and lowering said hinged section.

4. In a concrete mixing plant, the combination of a platform, a material bin on said platform, an upright conveyor casing mounted on said platform, said casing comprising a lower fixed section and an upper horizontally hinged section extending above said bin and foldable down on to the latter, guide rails disposed lengthwise of said bin, brace bars pivoted at their upper ends to said hinged section and at their lower ends engaged with said guide rails, and means for shifting the lower ends of said brace bars along said guide rails.

5. In a concrete mixing plant, the combination of a platform, a material bin on said platform, an upright conveyor casing mounted on said platform, said casing comprising a lower fixed section and an upper horizontally hinged section extending above said bin and foldable down on to the latter, guide rails disposed lengthwise of said bin, brace bars pivoted at their upper ends to said hinged section and at their lower ends engaged with said guide rails, a winch, and cables connecting said winch to the lower ends of said brace bars.

6. In a concrete mixing plant, the combination of a platform, a material bin on said platform, and an upright conveyor casing mounted on said platform, said casing comprising a lower fixed section of less height than said bin and an upper horizontally hinged section registering with the upper end of said fixed section; a portion of the wall of said bin lying opposite said hinged section being removable to permit said hinged section to be folded down to lie within the upper portion of said bin.

7. In a concrete mixing plant, the combination of a platform, a material bin on said platform, a vertical partition dividing said bin transversely into two compartments, and an upright conveyor casing mounted on said platform, said casing comprising a lower fixed section located within the rear end of said bin and of less height than the latter, and an upper horizontally hinged section registering with the upper end of said fixed section; a portion of the front wall of said bin and a portion of said partition being removable to permit said hinged section to be folded down to lie within the upper portion of said bin.

8. In a concrete mixing plant, the combination of a platform, a storage bin mounted on said platform, said storage bin comprising lower and upper separable sections, and an elevating conveyor comprising a lower fixed section mounted in said lower bin section and an upper hinged section mounted on and extending above said upper bin section and foldable on and removable with said upper bin section.

9. An elevating conveyor structure, comprising a conveyor casing formed in lower and upper detachable sections, an endless chain bucket conveyor mounted in said casing, and means for supporting the portion of said conveyor in the lower section of said casing in upright working position when the upper section of said conveyor and casing is removed.

10. An elevating conveyor structure, comprising a conveyor casing formed in lower and upper detachable sections, an endless chain bucket conveyor mounted in said casing, and means for supporting the portion of said conveyor in the lower section of said casing in upright working position when the upper section of said conveyor and casing is removed, said supporting means comprising a pin extending through apertures in opposide walls of said casing and through opposed links in said conveyor chain.

11. In a concrete mixing plant, the combination of a platform, a storage bin mounted on said platform, an elevating conveyor casing and conveyor mounted on said platform and at its delivery end overhanging said storage bin, and means mounted on the upper ends of said storage bin and conveyor casing for supporting a canopy covering above said bin.

12. In a concrete mixing plant, the combination of a platform, a storage bin mounted on said platform, an elevating conveyor casing and conveyor mounted on said platform at one end of said storage bin and having a delivery chute overhanging the latter, and cables connecting the top of said conveyor casing with the opposite end of said bin for supporting a canopy covering above said bin.

13. In a portable concrete mixing plant, the combination of a platform mounted on wheels, a material bin on said platform, and a false bottom in said bin dividing the latter into upper and lower material storage compartments, said false bottom having a valve controlled discharge port opening directly into said lower compartment.

14. In a portable concrete mixing plant, the combination of a platform mounted on wheels, a material bin on said platform, a false bottom in said bin dividing the latter into upper and lower material storage compartments, said false bottom having a pair of valve controlled discharge ports opening directly into said lower compartment, and a vertical partition dividing said upper compartment into gravel and sand storage compartments delivering gravel and sand respectively through said discharge ports.

ROBERT W. FIEROH.